Nov. 3, 1970 — D. ADOMAITIS — 3,538,211
BOTTLE BLOWING PROCESS AND APPARATUS
Filed Jan. 18, 1966 — 2 Sheets-Sheet 1
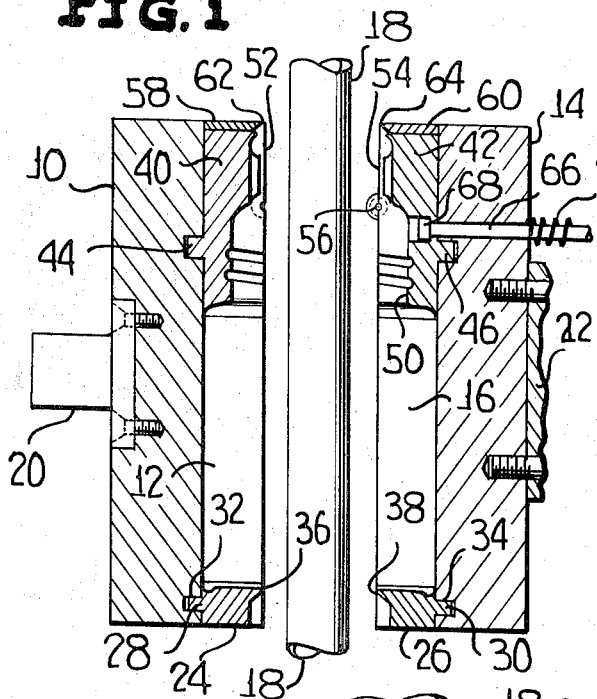
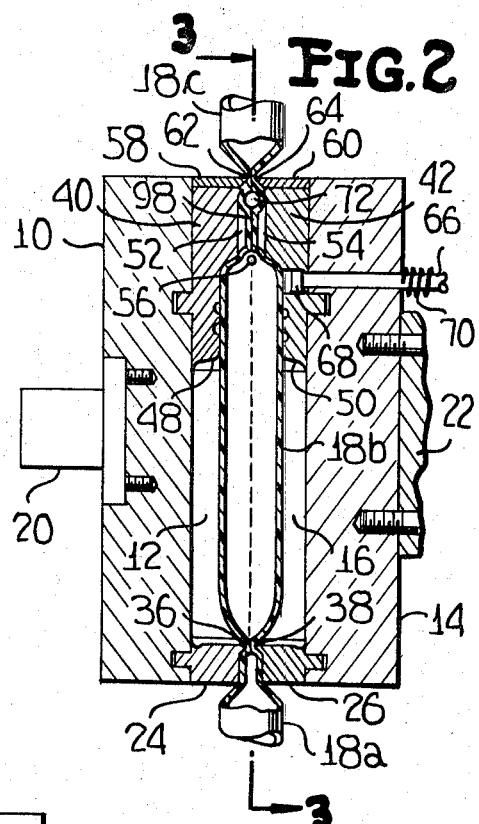
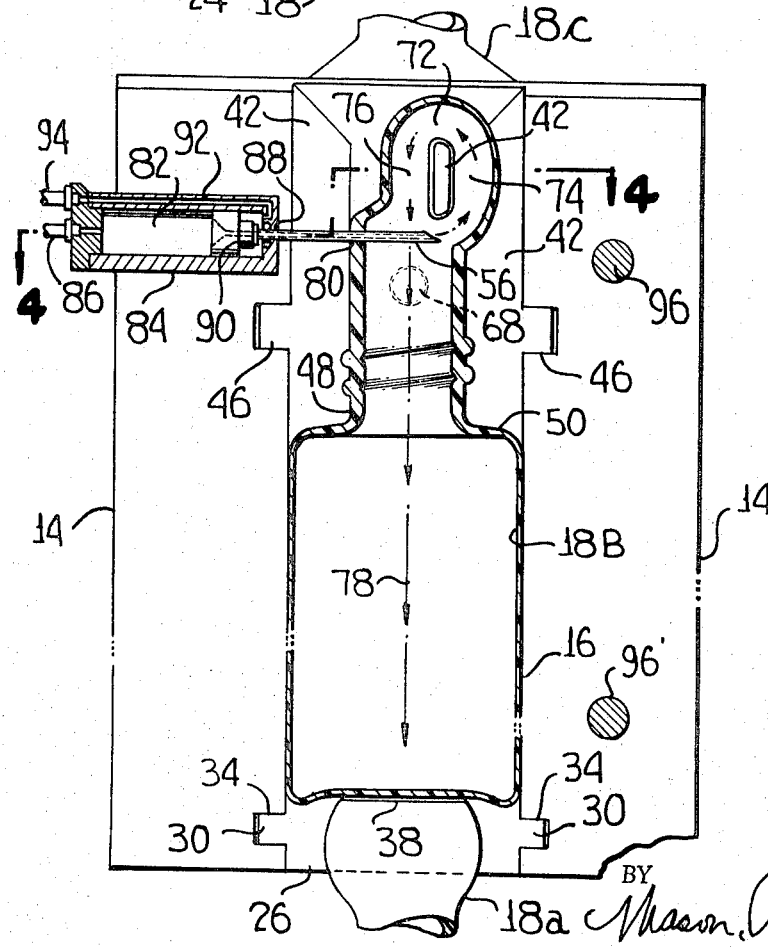
INVENTOR
DOMAS ADOMAITIS

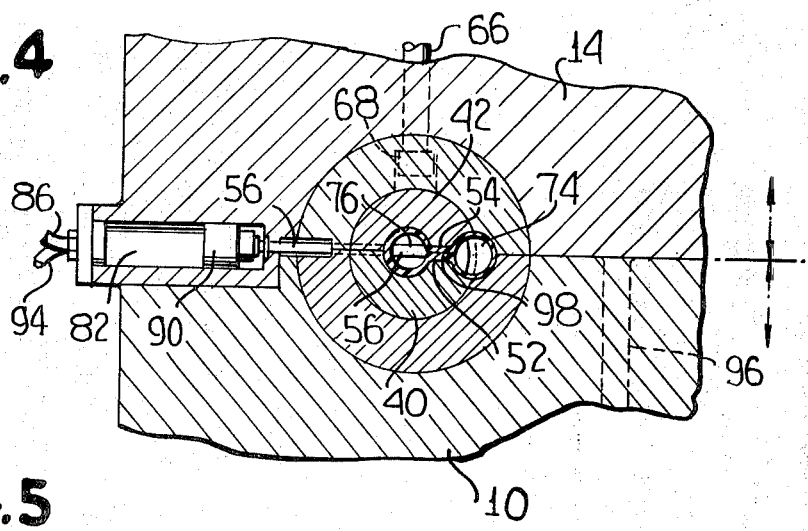
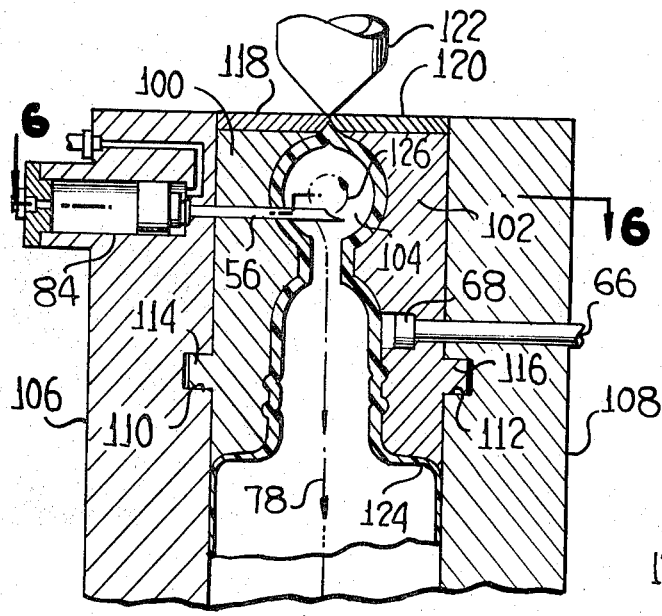
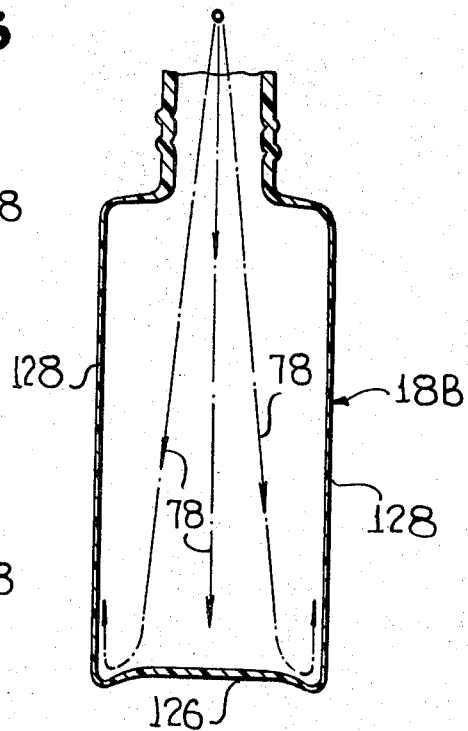
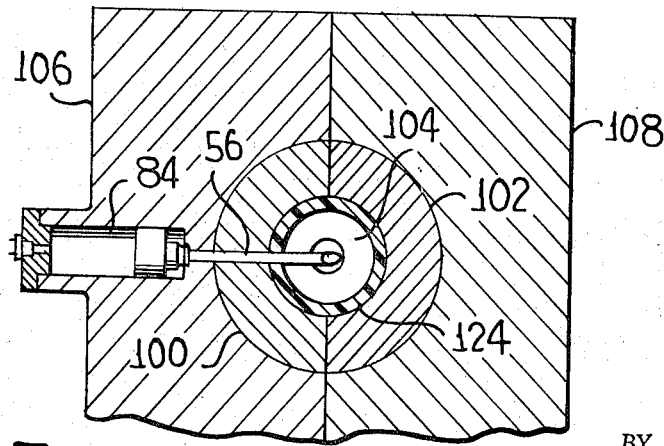

3,538,211
BOTTLE BLOWING PROCESS AND APPARATUS
Domas Adomaitis, Chicago, Ill., assignor to Continental Can Company, Inc., New York, N.Y., a corporation of New York
Filed Jan. 18, 1966, Ser. No. 521,378
Int. Cl. B29c 17/04
U.S. Cl. 264—96           9 Claims

ABSTRACT OF THE DISCLOSURE

This disclosure relates to an improvement in a blow molding apparatus wherein a split mold is provided with opposing land portions and adjacent cavities whereby upon the closing of the split mold a portion of the parison adjacent one of a pair of opposite end portions is pinched to form a generally spherical or annular channel into which air is introduced by a blow needle, and the channel functions to receive the introduced air, direct the air away from the other of the end portions, and thereafter redirect the air toward the other end portion in a uniform stream to uniformly expand the parison.

---

In a well known bottle blowing practice, a heated tubular parison is positioned between the sections of a mold and the mold sections are brought together to grip the parison therebetween and thus isolate a section thereof within the mold cavity. The parison is then pierced from the side by a hollow needle which permits the application of fluid pressure within the parison to cause the parison to expand and engage the mold or cavity surfaces. It is known that the manner in which the parison stretches and expands is most important in the production of high quality molded articles.

In blow molding methods and apparatus which employ a continuously extruded parison, the blowing fluid is applied through a hollow needle positioned by the closing of the mold and injected into the parison. After the mold has been closed, or during such closing, the blowing needle pierces the side of the parison, usually at an angle of ninety degrees with the parison or generally perpendicular to the longitudinal axis of the mold or the mold cavity.

In known methods, the blowing fluid, usually air, enters the parison and first bounces off the opposite or "knock-out" side of the parison back to the needle side and then enters into the remaining portion of the parison to continue expanding the parison to its desired form. Since the fluid stream bounces back and forth off the parison wall, the partially pre-blown parison becomes irregularly displaced and deformed from its central position. In this manner of blowing, the container wall is at least partially formed prior to the formation of the bottom of the container and there is a tendency to pull the lower portion of the parison upwardly. This action may cause a weakened "pinch-off" or weakened areas at and near the bottom. It sometimes happens also that since the moving fluid in the lower half of the container moves downwardly, the section of the parison which forms the bottom of the container may be blown but is not stretched uniformly as much as other areas and in such cases heavy bottom portions may result.

The results obtained according to the foregoing prior art practices revealed the fact that during the mentioned dislocations and objectionable expansions, the pinched section of the parison is being urged upwardly. Thus, it was discovered that the path of the airstream due to its erratic nature of bouncing and reflecting was that the parison was dislocated, the container wall was uneven or locally thinned, or a weakened bottom of the container occurred near the pinched-off section.

After detailed study of the problem, it was determined that the foregoing difficulties could be eliminated or greatly minimized by devising a method and structure for directing the blowing fluid in a substantially straight, downward path into the parison in order that the expansion of the parison could take place in a smooth and even manner.

Accordingly, it is the principal object of the present invention to improve presently known blow molding methods and apparatus.

It is a further object of the present invention to provide a method and apparatus for eliminating objectionable variations in wall thicknesses in blow molded articles, such as containers.

It is a further object of the present invention to provide a method and apparatus for forming blow molded articles, such as containers, having substantially uniform wall and bottom thicknesses.

It is a further object of the present invention to provide a means for controlling the blowing fluid path in blow molding operations in a manner determined to be most effective for producing articles of substantially uniform wall and bottom thicknesses.

It is a still further object of the present invention to provide a means for directing the blowing fluid employed in blow molding operations along a path generally concentric to the mold longitudinal axis so as to uniformly and outwardly expand the parison.

These and other objects of the present invention are accomplished by closing a mold of two sections and of special design, over a tubular parison. Within the cavity of the mold, there is designated a portion of the cavity which conforms to the body of an article, such as a container. Near one end, preferably the top, are means for forming the neck of the article along with a chamber connected to the neck and on a side of the neck opposite to that of the body of the article. A hollow needle is then projected into the cavity in such a direction that the blowing fluid emanating from the needle is directed against an outwardly and upwardly curving portion of the cavity to thereby impart a swirling motion to the fluid, and then against an upwardly and inwardly curved section followed by an outwardly and downwardly curved path and into the central portion of the parison in the cavity, which is generally concentric to the longitudinal axis of the cavity. That is to say, the blowing fluid enters the cavity and is first, directed upwardly away from the bottom of the mold or cavity to impart a swirling motion thereto and secondly, is reversed in direction so that the fluid flow is directed toward the bottom of the mold so as to uniformly expand the parison outwardly to engage the inner surfaces of the cavity of the mold.

In the preferred embodiment of the invention, opposing lands are formed on the mold halves and within the cavity so that upon the closing of the mold, the parison is pinched together by said lands at an area disposed so as to provide a fluid confining and directing channel through which the fluid follows from its entrance point to its point of longitudinal direction into the neck and body areas of the article.

In a further embodiment, a spherical section is formed juxtaposed the neck of the container and as the fluid is directed into the spherical chamber, it will follow the walls of the chamber until it reaches a point substantially in line with the longitudinal axis of the mold.

It will be readily understood by those skilled in the art that a neck insert may be positioned within the cavity of the mold to so shape the parison as to provide either the chamber or the fluid confining and directing channel, or the cavity may be formed in such a manner that the neck insert meeting the foregoing description is integrally joined to the mold.

As the mold sections close toward one another, means are positioned adjacent the ends of the mold for pinching the parison and thereby defining the ends of the molding cavity and therefore the end extremities of the molded unit. At the conclusion of the blow molding process, means cooperating with the mold are actuated so as to eject the article from the mold after the mold has been opened. Thereafter, the article so formed may be trimmed and finished, as desired.

The invention both as to its organization and method of operation together with further objects and advantages thereof will best be understood by reference to the following specification taken in conjunction with the accompanying drawings in which:

FIG. 1 is a vertical cross-sectional view illustrating the open position of the mold halves and a parison or extruded tube between the mold halves or sections;

FIG. 2 is a view, similar to FIGURE 1, but showing the mold sections in their closed position wherein the parison has been pinched and prior to the step of blowing or expanding the hot parison;

FIG. 3 is a vertical cross-sectional view taken at a 90° relation to the section of FIG. 2 or along the line 3—3 of the FIG. 2 and illustrating the blowing needle in blowing position, the formation of the fluid directing and confining channel in the neck of the container, and the completion of the blowing of an article such as a container;

FIG. 4 is a horizontal sectional view taken along the line 4—4 of the FIG. 3;

FIG. 5 is a fragmentary sectional view similar to FIG. 3 and showing a second embodiment of the invention wherein a spherical chamber is formed during the blowing of the neck of the article by the mold and which serves to impart a swirling motion to the blow molding fluid;

FIG. 6 is a sectional view taken along the line 6—6 of the FIG. 5; and

FIG. 7 is a sectional view of a container which has been formed in accordance with the practices of the present invention and illustrating the path of the blowing fluid achieved by these techniques so as to achieve a blowing sequence from the bottom of the container and upwardly along the walls of the container.

Wtih reference to the FIG. 1, the mold includes a mold half or section 10 having a mold cavity 12 and a mold half 14 having a mold cavity 16. The mold halves 10 and 14 are shown in their open position so as to permit the insertion of a tubular parison 18 therethrough. The tubular parison 18 may be of any suitable plastic and well known material and is at a temperature sufficient to permit the subsequent expansion of the parison 18 so as to form an article, such as a container. The mold half 10 includes the means 20 while the mold half 14 includes the means 22 which means 20 and 22 may be employed for opening and closing the mold halves 10 and 14, securing the mold to a base, or for advancing the apparatus, as appropriate.

With continued reference to the FIG. 1, means are employed in the lower portion of the mold cavities 12 and 16 for pinching the parison 18 and thereby determining the lower terminus of the article. In addition, means are employed in the upper section of the mold cavities 12 and 16 for not only pinching the parison 18 and thereby determining the upper terminus of the article, but also for defining the neck of the article as well as means for defining a chamber for imparting a swirling motion to the blowing fluid. It will be readily understood to those having skill in the art that the foregoing means, although shown as inserts in the figures, may not be separate inserts or sections but may be integrally formed within the mold halves 10 and 14.

More specifically, a pair of bottom inserts 24 and 26 are retained in the lower portion of the mold cavities 12 and 16, respectively. Through the cooperation of a peripheral rim 28 and 30 formed about the bottom inserts 24 and 26, respectively, and a pair of notches 32 and 34 formed, respectively, in the cavity walls 12 and 16 of the the mold halves 10 and 14, the bottom inserts are retained in the position illustrated. Projecting from each of the bottom inserts 24 and 26 and toward the parison 18, is a pinching means 36 and 38 which, when the mold is closed, will engage the parison 18 and close the parison tube so as to inhibit the subsequent escape of molding fluid.

A pair of neck inserts 40 and 42 are positioned, respectively, in the upper extremities of the mold cavities 12 and 16 and may be retained in position by a pair of rims 44 and 46 which engage notches formed in the cavity walls, similar to the notches 32 and 34 for retaining the bottom inserts 24 and 26. The neck insert 40 includes a configuration 48 for defining the utilitarian and esthetic features of a completed article such as threads for retaining a cap, curving sections, etc. Similarly, the neck insert 42 includes a configuration 50 for performing like functions. A salient feature of the invention is the inclusion of a land 52 in the neck insert 40 and a land 54 in the neck insert 42 which when the mold is closed, pinch the parison 18 so as to form a loop or channel for the blowing fluid, such as air, and thereby confine and direct the air to the most efficacious path. A blowing needle 56 is visible in the FIG. 1 and its detail will be discussed with reference to subsequent figures.

The upper pinching means for the parison 18 are identified as 58 and 60 and are secured in any suitable manner to the neck inserts 40 and 42, respectively, and are coplanar with the upper terminal end of the mold halves 10 and 14. The pinching means 58 and 60 have sharp extending surfaces 62 and 64, respectively, for engaging and pinching the parison 18 upon the subsequent closing of the mold halves 10 and 14. In addition, a knock-out shaft 66 having a knock-out pad 68 secured thereto is biased outwardly by a spring means 70, and when the knock-out shaft 66 is actuated toward and into the configuration 50 formed in the neck insert 42 so as to overcome the bias of the spring means 70, a blown article formed from the parison 18 in the mold halves 10 and 14, will be ejected.

With reference to FIG. 2, the view illustrates the step of blow molding immediately after the closure of the mold halves 10 and 14 and prior to the application of a fluid through the blowing needle 56, which application of blowing fluid will result in an expansion of the parison to fill all the cavities within the mold halves 10 and 14. It will be observed by reference to FIG. 2 that a section of the parison 18b has now been pinched and connected portions of the parison or tube are indicated at 18a. Usually, the parison will not be completely severed at the pinched areas although such may occur if this be desirable or would expedite the operation.

From the FIG. 2, it will be noted that the pinching means 36 and 38 of the bottom inserts 24 and 26 have engaged the parison and have joined the parison at this point. Similarly, the pinching surfaces 62 and 64 of the upper pinching means 58 and 60 have engaged the parison and closed it off at this point. By this operation, the section of the parison 18b to be presently formed into an article such as a container, is effectively sealed so as to prevent the escape of blowing fluid when introduced from the tip of the blowing needle 56.

In addition to the foregoing pinching operations upon the parison, the lands 52 and 54 of the neck inserts 40 and 42 have pinched the parison together so as to form a channel which imparts a swirling motion to the entering fluid and then directs it substantially downwardly toward the bottom of the pinched and isolated parison portion 18b. The upper section and the lower section of the channel formed through the cooperation of the lands 52 and 54 are clearly visible in the FIG. 2 with the upper section being identified as 72. A more adequate discussion of the channel or loop will be had with subsequent reference to the FIGS. 3 and 4.

As shown in the FIG. 3, which is an enlarged sectional view taken along the line 3—3 of the FIG. 2, the blowing needle 56 is in its extended position and injecting a stream of fluid into the swirl channel. The fluid enters from the discharge orifice of the needle 56 and commences an outwardly and upwardly curving path 74 around the lands 52 and 54. From the upwardly and outwardly curving path of the fluid 74, the fluid enters the upper section 72 of the channel which forms an upward and inward direction so as to impart a swirling motion to the fluid. From the upper section 72 the fluid path turns outwardly and downwardly into an area identified as 76 and then follows the path indicated by the arrow 78 to strike the pinch closed bottom of the parison. In summary, the fluid path from the discharge orifice of the needle 56 proceeds from the area 74, to the upper section 72, to the section 76 where the path of the fluid is reversed from that of the section 74, and then continues downwardly along the path indicated by the arrow 78. Thus, a fluid confining and directing channel is formed by the sections 74, 72 and 76 which impart a swirling motion to the fluid and direct it downwardly so as to more effectively and efficaciously force the parison against the walls of the cavity of the mold.

The blow needle 56, best shown in the FIG. 3, includes apparatus for rapidly advancing the needle 56 toward the parison so as to pierce the parison at a piercing area indicated at 80 and to then retract at the appropriate time after its mission has been accomplished. More specifically, this reciprocating mechanism includes a chamber or cylinder 82 formed by a casing 84 which communicates with a source of fluid under pressure via a connection 86. The needle 56 which protrudes from the casing 84 is supported by an aperture 88 formed in the end of the casing 84 opposite to that of the connection 86. A piston 90 slides within the chamber 82 and the application of a fluid under pressure to the connection 86 fills the chamber 82 and forces the piston 90 carrying the needle 56 into piercing engagement with the parison 18b. A conduit 92 is formed along one side of the casing 84 which when supplied with fluid under pressure, directs the fluid toward the opposite side of the piston 90 so as to drive it rearwardly and retract the needle from the parison. A connection 94 communicates with the conduit 92 for supplying fluid under pressure to retract the blowing needle 56. Thus, the application of a suitable fluid under pressure to the connection 86 will not only drive the blowing needle 56 through the parison but will also supply fluid for accomplishing the blow molding operation. After the blow molding step is to be terminated, the connection 86 would be vented to the atmosphere so that the application of a fluid under pressure to the connection 94 would retract the needle 56.

As shown in the FIG. 3, a suitable number of mold aligning pins are provided, such as the pins illustrated at 96 and 96'. It will be understood by those skilled in the art that the number and position of the aligning pins 96 will be determined by the size, configuration, etc., of the mold. Further, it will be understood that the casing 84 of the needle mechanism will be housed, as appropriate, in either one or both of the mold halves 10 and/or 14.

The FIG. 4 is a sectional view taken along the line 4—4 of the FIG. 3 and clearly illustrates the alignment of the blowing needle 56 with the fluid directing and confining chamber formed by the sections 74, 72 and 76. More specifically, the fluid from the blowing needle 56 would be injected into the section 74 and proceed upwardly out of the plane of the paper. The swirling motion would then continue through the upper section 72 of the channel (not shown in the FIG. 4) and then enter the outwardly and downwardly directing section 76, the path of the fluid being into the plane of the paper and approximately 180° reversed from the path of the fluid while in the section 74 of the chamber. It will be noted that the parison is pinched together as indicated at 98 by the lands 52 and 54 of the neck inserts 40 and 42, respectively. The mold sections 10 and 14 may move away from each other for opening the mold and toward each other for closing the mold, as indicated by the pair of arrows at the right side of the FIG. 4. After blowing an article and the opening of the mold, the knock-out shaft 66 would be actuated so that the knock-out pad 68 would engage the molded article and remove it from the mold.

The FIGS. 5 and 6 illustrate a second embodiment of the invention, the principle difference from the earlier embodiment being in the formation of the fluid swirling chamber. As shown in the FIGS. 5 and 6, a spherical chamber is formed by a pair of appropriate neck inserts 100 and 102 which cooperate to form a spherical chamber indicated at 104. The neck inserts 100 and 102 are positioned within a pair of mold sections 106 and 108, respectively, which have formed about their inner surfaces a pair of recesses 110 and 112 which cooperate to engage a pair of flanges 114 and 116 formed about the neck inserts 100 and 102, respectively. A parison pinching means 118 cooperates with a similar parison pinching means 120 located, respectively, affixed to the upper surfaces of the neck inserts 100 and 102 and coplanar with the mold sections 106 and 108. A parison 122 is advanced between the mold sections 106 and 108 when opened, and after blowing, an article is formed, such as indicated at 124. A similar shaft 66 and knock-out pad 68 will remove the article 124 from the mold sections 106 and 108 when the mold is opened.

As shown in the FIGS. 5 and 6, the fluid when ejected from the blowing needle 56 will enter the chamber 104 and engage the walls of the chamber 104 which due to its configuration, imparts a swirling motion to the fluid so that the fluid follows a path generally indicated in the chamber by the arrow 126 and is then directed downwardly along the path indicated by the arrow 78 to thereby apply a force to the bottom portion of the parison to result in an expansion of the parison which proceeds generally from the bottom of the parison upward along the walls until the parison completely fills the cavity provided by the mold sections 106 and 108 and the neck inserts 100 and 102. By providing a swirling motion to the fluid, a general path is imparted to the fluid rather than a haphazard or undefined path as previously known in the art.

The FIG. 7 illustrates the path of the fluid after leaving the fluid defining and directing channel of the FIG. 3 or the spherical channel 104 of the FIG. 5 which is generally downwardly toward the bottom 126 of the article or formed parison 18B and along the path indicated generally by the arrows 78. In this manner, the heretofore mentioned upward pulling on the pinched parison is avoided and the article blowing is performed in a progressive upward direction, commencing with the bottom 126. Thus, it will be observed that the wall of the parison which results in the wall 128 of the article 18B is uniformly stretched since little or no engagement of the parison with the mold cavity results when a controlled fluid direction procedure is applied in the manner set forth and illustrated in the figures.

Thus, in accordance with the teachings of the present invention, the blowing fluid after having a swirling motion imparted thereto, is directed straight downwardly toward the bottom of the mold so that the parison expands outwardly and from the bottom upwardly. Two embodiments are described and illustrated for imparting a swirling motion to the fluid. In the first embodiment, a mold having lands is employed so as to pinch the parison and thereby define a fluid confining and directing channel so that the entering stream of fluid is confined to the channel and is thereby "swirled" through the channel to enter a final path directed toward the bottom of the mold. In another embodiment, a spherical chamber is formed by a neck insert of the mold and a swirling motion is imparted to the fluid as the fluid engages the curved surfaces of the chamber and then leaves the chamber to proceed directly downwardly toward the bottom of the mold. In this manner, the blowing of the lower half of the bottle by a downward stretching of the walls is avoided and a uniform wall thickness of an article is obtained by the teachings of the invention as set forth. Since the path of the blowing fluid is closely controlled, the random fluid paths and nonuniform paths are avoided.

I claim:
1. A method of blow molding an article of substantially uniform wall thickness comprising the steps of forming a tubular parison, closing opposite ends of the parison, pinching a central portion of the parison adjacent one of said ends to form a removable and discardable chamber, and directing pressurized fluid into the chamber whereby the fluid is received in the chamber, directed toward the one end of the parison, and is thereafter redirected toward the other end.

2. Apparatus for blow molding an article from a parison comprising a split mold defining an article-forming cavity having opposite end portions, means for introducing fluid under pressure into a parison in said cavity at one of said opposite end portions, and means in said cavity at said one end portion for shaping a removable and discardable portion of the parison to receive the introduced fluid, direct the received fluid away from the other of the end portions, and thereafter redirect the fluid toward said other end portion.

3. The apparatus as defined in claim 2 wherein said last-mentioned means includes opposing parison wall pinching land means for forming a fluid directing channel in a parison upon the closing of said split mold.

4. The apparatus as defined in claim 2 wherein said last-mentioned means includes a generally annular chamber forming a part of the mold cavity, and said introducing means is a blow needle for piercing and entering the parison in the area of said annular chamber.

5. The apparatus as defined in claim 2 wherein said introducing means is a blow needle for piercing and entering the parison upon movement of the blow needle parallel to a plane taken through parting surfaces of the split mold.

6. The apparatus as defined in claim 2 wherein said last-mentioned means includes a generally spherical chamber forming a part of the mold cavity, and said introducing means is a blow needle for piercing and entering the parison in the area of said spherical chamber.

7. The apparatus as defined in claim 2 wherein said split mold includes a pair of mold bodies having opposing parting line surfaces, said last-mentioned means includes opposing parison wall pinching land means for forming a fluid directing channel in a parison upon the closing of said mold bodies, said introducing means is a blow needle for piercing and entering the parison upon movement of the blow needle parallel to a plane taken through the parting surfaces of the split mold, and a plane through the parting surface of the split mold in the closed position thereof is generally parallel to said pinching land means and the axis of said blow needle.

8. The apparatus as defined in claim 7, wherein a common plane passes through the axis of said blow needle and the parting surface of said split mold.

9. Apparatus for blow molding an article from a parison comprising a split mold defining an article-forming cavity having opposite end portions, said split mold including a pair of mold bodies, means for introducing fluid under pressure into a parison in said cavity at one of said opposite end portions, said fluid introducing means being a blow needle, means in said cavity at said one end portion for pinching a portion of the parison to form a chamber for receiving the introduced fluid, directing the received fluid away from the other of said end portions, and thereafter redirecting the fluid toward said other end portion, and means for introducing said blow needle into said parison at a point between said pinching means and one of said split mold end portions, and in the area of said chamber.

References Cited
UNITED STATES PATENTS

| | | | |
|---|---|---|---|
| 3,048,891 | 8/1962 | Maass | 264—98 |
| 3,198,861 | 8/1965 | Marvel. | |
| 3,338,998 | 8/1967 | Di Settembrini. | |
| 3,342,916 | 9/1967 | Peters | 264—98 |

ROBERT F. WHITE, Primary Examiner

T. J. CARVIS, Assistant Examiner

U.S. Cl. X.R.
264—98; 18—5